United States Patent
Shuler

(10) Patent No.: US 9,242,669 B2
(45) Date of Patent: Jan. 26, 2016

(54) RUDDER-ASSISTED STEERING FOR SELF-PROPELLED DRAINAGE EQUIPMENT

(71) Applicant: Trimble Navigation Limited, Sunnyvale, CA (US)

(72) Inventor: Joshua W. Shuler, Wellington, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 132 days.

(21) Appl. No.: 14/255,550

(22) Filed: Apr. 17, 2014

(65) Prior Publication Data

US 2015/0298731 A1    Oct. 22, 2015

(51) Int. Cl.
| *A01B 69/00* | (2006.01) |
| *B62D 6/00* | (2006.01) |
| *B62D 11/10* | (2006.01) |
| *B62D 11/14* | (2006.01) |
| *B62D 11/02* | (2006.01) |
| *B62D 7/15* | (2006.01) |

(52) U.S. Cl.
CPC ............... *B62D 6/00* (2013.01); *A01B 69/007* (2013.01); *B62D 11/10* (2013.01); *B62D 11/14* (2013.01); *A01B 69/003* (2013.01); *B62D 7/159* (2013.01); *B62D 11/02* (2013.01)

(58) Field of Classification Search
None
See application file for complete search history.

(56) References Cited

U.S. PATENT DOCUMENTS

| 2006/0013652 A1* | 1/2006 | Schafer | E02B 11/00 404/46 |
| 2008/0185212 A1* | 8/2008 | Akuta | B62D 6/002 180/400 |
| 2010/0276015 A1* | 11/2010 | Schafer | F16K 31/24 137/527 |
| 2013/0311144 A1* | 11/2013 | Meiners | G06F 17/5004 703/1 |

OTHER PUBLICATIONS

Trimble Navigation Limited, "Trimble WM-Drain Farm Drainage Solution" Brochure (2011-2014); 4 pages.

* cited by examiner

*Primary Examiner* — Mussa A Shaawat
(74) *Attorney, Agent, or Firm* — Swanson & Bratschun, L.L.C.

(57) ABSTRACT

Novel tools and techniques for performing steering operations for a tracked vehicle with a dragged implement using a control system that uses a combination of differential steering and rudder steering based on one or more operating conditions of the vehicle.

21 Claims, 6 Drawing Sheets

RUDDER-ASSISTED STEERING FOR SELF-PROPELLED DRAINAGE EQUIPMENT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to vehicle steering, and more particularly, to enhanced control systems to control vehicle steering using a combination of differential steering and rudder steering.

BACKGROUND

Excess subsurface water creates numerous problems for agriculture land including less than optimal growing conditions for crops and reduced access to cropland by farm equipment due to limited traction. One technique for removing excess subsurface water is to install tile drainage. Tile drainage can take a variety of forms, for example, polyethylene corrugated drainage pipe. The tile drainage is installed below the surface of the land and collects and drains excess subsurface water. By removing the excess subsurface water, the water table is lowered to an optimal level for growing the desired crops and to provide greater access to the land by farm equipment.

Before tile drainage is installed in an area with excess subsurface water, traction for farm equipment is generally limited. As a result, tile drainage is often installed using a tracked vehicle pulling a tile plow. The tracked vehicle pulls the tile plow to create a ditch to a desired depth. As the tile plow creates the ditch, the tile drainage is installed in the ditch.

However, because of the excess subsurface water and the significant weight of the tile plow, even tracked vehicles often experience limited traction when installing the tile drainage. Traction problems are particularly acute when a tracked vehicle needs to turn for example, to follow the contour of the field where the drainage tile is being installed. When relying solely on its differential steering to turn, a tracked vehicle will often have to either slow down or get stuck and have to raise the tile plow in order to regain traction. In either case, the limited traction creates significant inefficiencies and delays in installing tile drainage.

In addition, farm operators typically require tile drains to be installed precisely in terms of both depth and location. In particular, tile drains are installed using tracked vehicles with onboard positioning equipment, such as a global navigation satellite system receiver and/or automated steering system. Therefore, a tracked vehicle used to install tile drainage must be able to make precise turning adjustments that its differential steering often cannot provide in limited traction environments.

Accordingly, there is a need for control systems to enable more precise turning for tracked vehicles pulling a dragged implement such as a tile plow.

BRIEF SUMMARY

Certain embodiments provide tools and techniques for improved steering of a tracked vehicle pulling a dragged implement. In an aspect of particular embodiments, these tools allow a control system of a tracked vehicle to steer using a combination of differential and rudder steering wherein the dragged implement, such as a tile plow, is used for rudder steering. The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Merely by way of example, a tracked vehicle (which might be a bulldozer, tracked tractor, or other tracked earthmoving or agriculture equipment), in accordance with one set of embodiments, might comprise a chassis coupled to two or more tracks configured to provide differential steering as well as a dragged implement coupled to the chassis. The vehicle might also comprise a control system configured to steer the vehicle using a combination of differential steering and rudder steering wherein the control system steers the vehicle in whole or in part with the dragged implement operated as a rudder.

In some cases, the tracked vehicle might comprise a control system comprising a processor, a non-transitory storage medium, and a set of instructions executable by the processor. Such instructions can include, without limitation, instructions to receive a steering input and one or more operating conditions of the vehicle such as without limitation the weight of the dragged implement and traction of the vehicle. The set of instruction might further comprise instructions to determine the combination of differential steering and rudder steering to properly steer the vehicle in the present operating conditions and then control the tracks and dragged implement to steer the vehicle.

Yet another set of embodiments provides methods. One exemplary method might comprise a method of steering a vehicle with a control system configured to receive the steering input, identify one or more operating conditions of the vehicle, and determining the combination of differential and tracked steering to employ to achieve the desired steering input.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
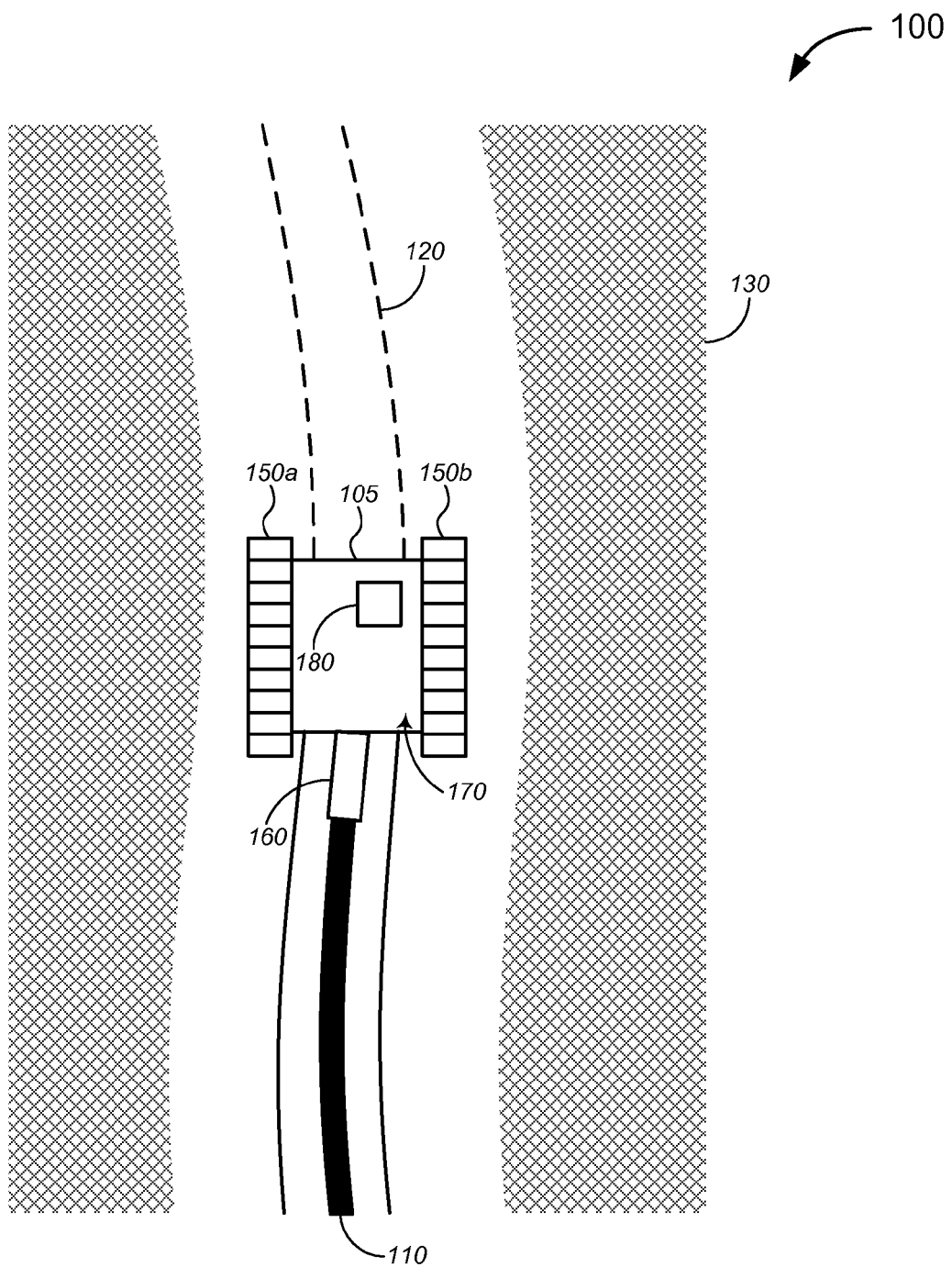
FIG. 1 illustrates a system for enhanced control systems to control vehicle steering, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present inventions may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments provide tools and techniques for improved steering of a tracked vehicle pulling a dragged implement. In an aspect of particular embodiments, these tools allow a control system of a tracked vehicle to steer using a combination of differential and rudder steering wherein the dragged implement such as a tile plow is used for rudder steering. For example, FIG. 1 (which is not drawn to scale) illustrates a system 100 for steering tracked vehicle 105 while it is, for example, using a tile plow to install tile drainage in a limited traction environment. As noted above, such tracked vehicle 105 can include any number of tracked machines or vehicles, such as, without limitation, a bulldozer, tracked tractor, or other tracked earthmoving or agricultural equipment capable of pulling a dragged implement such as a tile plow. Tracked vehicle 105 comprises both a chassis 170 and at least two tracks 150a and 150b. In the example illustrated by FIG. 1, the tracked vehicle 105 might be a tracked tractor pulling a tile plow 160 to install tile drainage 110. In some aspects, the tracked vehicle 105 might utilize a global navigation satellite system ("GNSS") receiver and/or automated steering system. In an aspect, for example, a control system 180, which controls operation of the tracked vehicle 105 and/or provides guidance to an operator of the tracked vehicle, might incorporate a GNSS receiver and/or might receive data from an external GNSS receiver. Such a control system 180, for example, can control operation of tracks 150, tile plow 160, engine speed, transmission settings, and the like (autonomously and/or based on operator input) to effectuate the techniques described in further detail below. In another aspect, the control system 180 can be a computer system (examples of which are described below) that communicates with other vehicle systems via a controller area network bus (CAN bus) or other communication interface.

Typically, in modern farming operations, subsurface tile drainage is required to be installed in precise locations using commercially available products such as the Trimble WM-Drain Farm Drainage Solutions. Such tile drainage systems are often installed using a tracked vehicle such as the vehicle 105 illustrated by FIG. 1. In the example shown in FIG. 1, the desired location for the tile drain follows the contours of the field as shown in tile drainage path 120. Generally, subsurface drainage systems must be installed in a limited traction environment as indicated by the cross hatching 130 in FIG. 1.

In installing tile drainage 110 along the desired tile drainage path 120 in limited traction environment 130, the control system 180 of the tracked vehicle can employ various combinations of the vehicle's differential steering for tracks 150 as well as the tile plow 160 (ranging from entirely differential steering using only the tracks to entirely rudder steering using only the plow), depending on the embodiment and/or the circumstances. Specifically, as shown in the example in FIG. 1, the differential steering for tracked vehicle 105 will use any number of steering mechanisms to cause inner track 150a to move slower (or even in the opposite direction) of outer track 150b in order to turn left along drainage path 120. To provide additional steering capability in limited traction environment 130, the steering control system in tracked vehicle 105 uses tile plow 160 as a rudder. By using tile plow 160 as a rudder, the steering control system enables tracked vehicle 105 to turn along drainage path 120 without having to slow down or lose traction and have to stop installing drainage tile and lift the tile plow. Because tile plow 160 in FIG. 1 is in the ground, its movement by the control system either left or right (in relation to the chassis 170) will provide turning capability to tracked vehicle 150, much like a rudder of a boat or an airplane. The use of a dragged implement to steer is particularly effective in limited traction environments because there is less friction between the tracks and the ground surface that reduces the effectiveness of the tracked vehicle's differential steering but also reduces the vehicle's resistance to rudder steering input.

Figure 2:
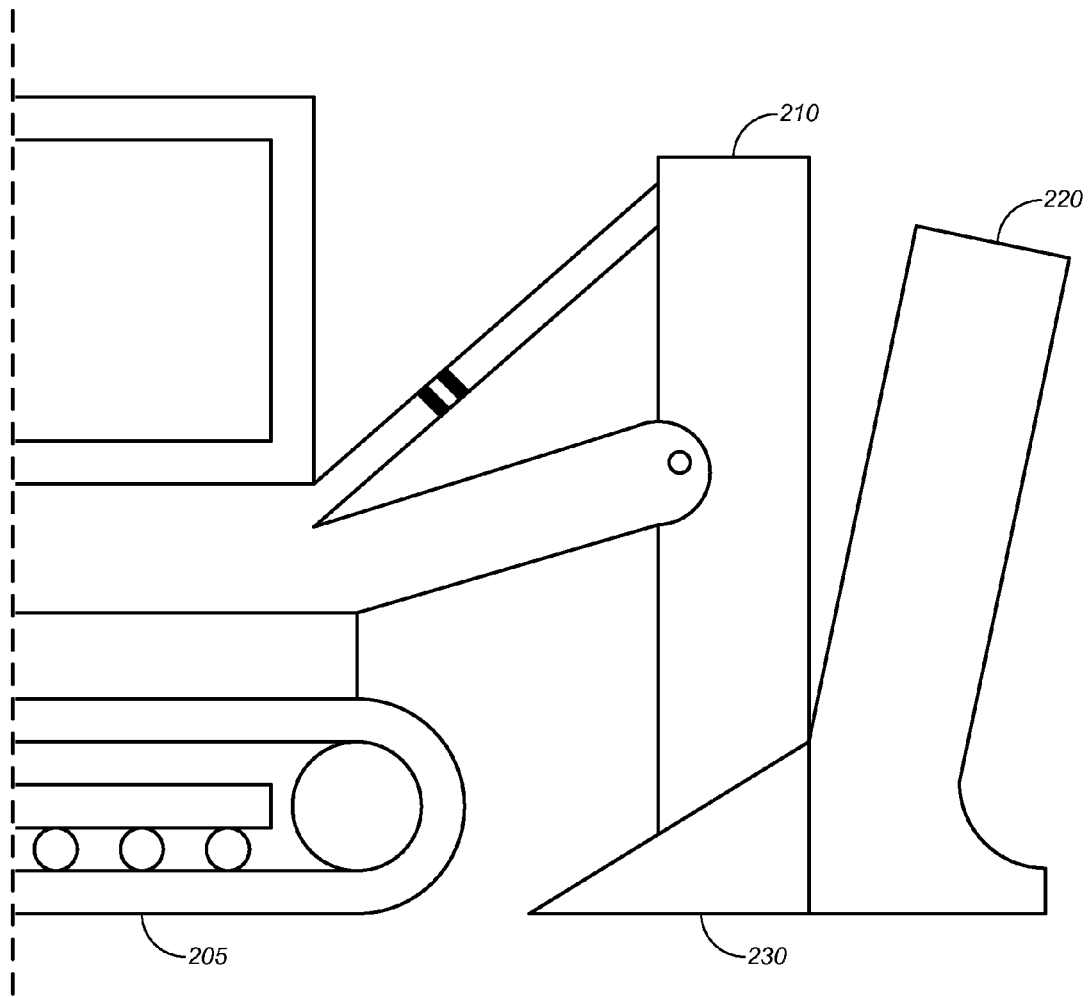
FIG. 2 illustrates a tracked vehicle with a dragged implement, in accordance with various embodiments.

FIG. 2 is a simplified drawing of the back end section of a tracked vehicle 205 with a dragged implement 210, which in this embodiment is a tile plow, but could also be any a variety of other types of dragged implements. The tile plow 210 has a tile placement mechanism 220 that places the tile in the trench created by the trench assembly 230. It should be appreciated that tracked vehicle 205 depicted in FIG. 2 is illustrated, and described, with a high degree of generality, and that a typical tracked vehicle will have many other components and systems. Tracked vehicle 205 is described herein merely for purposes of illustrating the concepts of certain embodiments with regard to steering a tracked vehicle with a combination of differential steering and rudder steering with a dragged implement.

Figure 3:
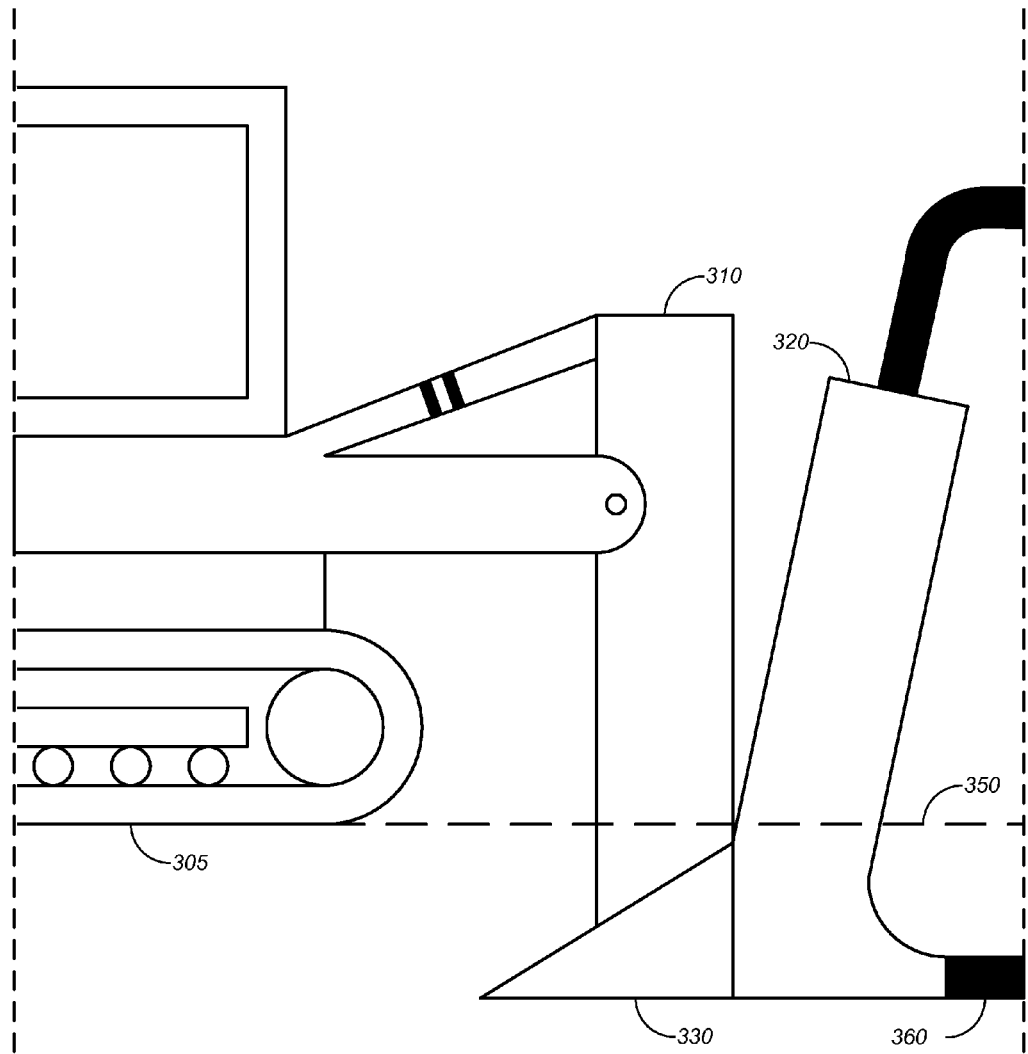
FIG. 3 illustrates a tracked vehicle with a dragged implement installing tile drainage, in accordance with various embodiments.

FIG. 3 is a simplified drawing of the back end section of tracked vehicle 305 pulling tile plow 310 below the field surface 350. As tracked vehicle 305 pulls tile plow 310 to create a trench, the drainage tile is fed through the tile placement mechanism 320 and placed in the ground as shown by installed drainage tile 360.

Figure 4:
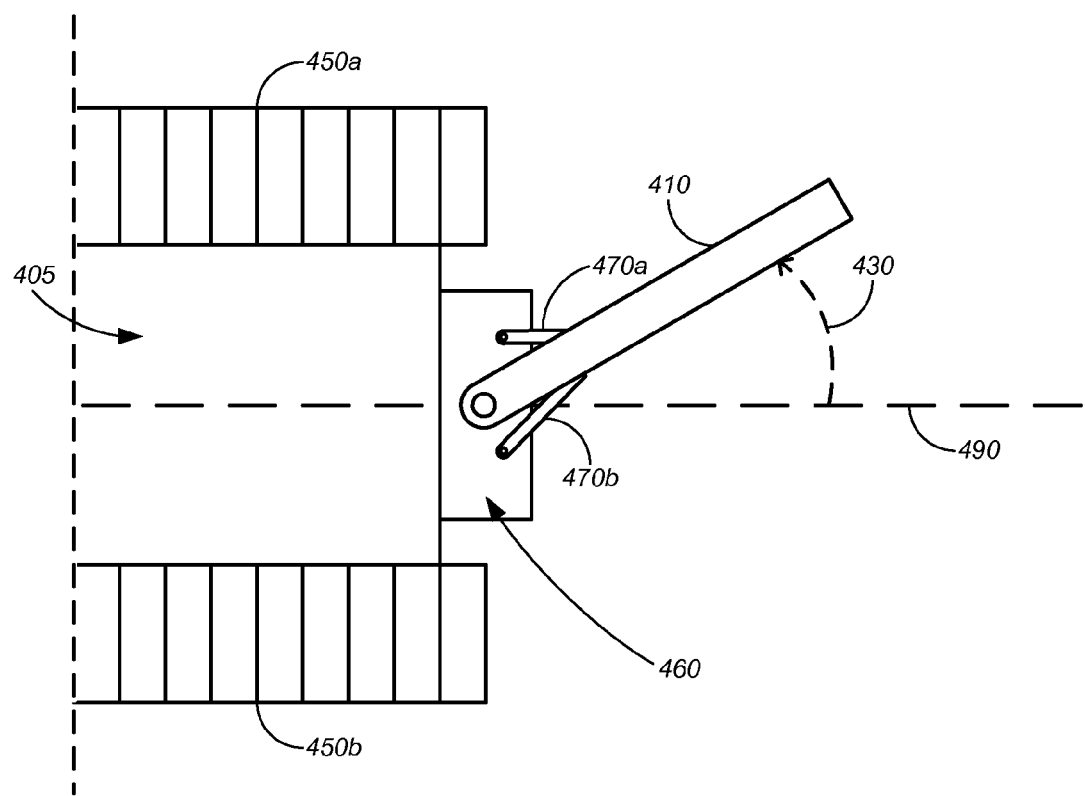
FIG. 4 illustrates a tracked vehicle with a dragged implement used for vehicle steering, in accordance with various embodiments.

FIG. 4 is a simplified drawing of the back end section of tracked vehicle 405 coupled to dragged implement 410. In this embodiment, the dragged implement is coupled to tracked vehicle 405 with a coupling mechanism 460 that includes hydraulic pistons 470a and 470b capable of turning the dragged implement at an angle 430 from center line 490. In an aspect, a steering control system of the vehicle 405 (which is not shown in FIG. 4 but which can be in communication with or incorporated by the control system described with respect to FIG. 1) causes, in this embodiment, the hydraulic pistons to move the dragged implement in either direction relative to the center line 490 of the chassis of the vehicle 405 while the dragged implement is in use and beneath the ground surface as shown in FIG. 3. The force of the dragged implement against the ground acts as a rudder that causes the tracked vehicle 405 to turn in the direction of the dragged implement. In other words, if the steering control unit pushes the dragged implement to the right of the center line as shown in FIG. 4, tracked vehicle 405 will also turn to the right of the center line.

As those skilled in the art can appreciate, the type of coupling mechanism 460 used to couple the dragged implement 410 to tracked vehicle 405 in FIG. 4 can vary greatly depending on numerous factors, including without limitation the type of tracked vehicle, the weight of the dragged implement, the maximum depth of the trench created by the dragged implement, and the desired maximum angle 430. The greater the angle 430 that can be created between center line 490 and dragged implement 410, the smaller the turn radius of the vehicle generated by the dragged implement 410. In FIG. 4, the hydraulic pistons 470a and 470b are sized to have sufficient force to create an angle 430 between the center line 490 and dragged implement 410. As those of ordinary skill in the art can appreciate, a wide variety of coupling mechanisms can be used in the claimed embodiments such that the steering control mechanism can create desired angle 430 between the center line 490 and dragged implement 410 while dragged implement 410 is in the ground as shown in FIG. 3.

A control system for a tracked vehicle (which can include a steering control system) might comprise a processor and non-transitory computer readable memory to store and execute a set of instructions to steer to the vehicle. As one of ordinary skill in the art will appreciate, the steering control system can be included as part of the control system of the vehicle, which can include (or be incorporated within) a navigation system, on-board computer system, and/or controller area network bus (CAN bus) for tracked vehicle 405. The control system may also reside within a computer outside of the tracked vehicle 405 that is capable of sending steering instructions to the tracked vehicle remotely or through an auto-pilot system. Each such steering control system for tracked vehicle 405 can store and execute a set of instructions to steer the vehicle.

Figure 5:
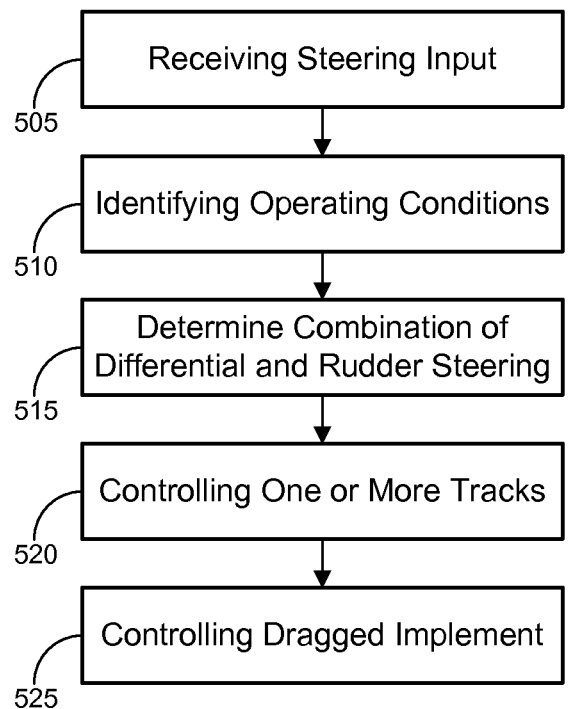
FIG. 5 is a process flow diagram illustrating a method of controlling a vehicle's steering, in accordance with various embodiments

Although FIGS. 1 through 4 illustrate specific examples of certain types of tracked vehicles with dragged implements, the skilled reader should understand that embodiments are not limited to these specific examples. Rather, embodiments can include any type of tracked vehicle with a dragged implement that can operate in accordance with the techniques and principles described herein. For example, FIG. 5 illustrates a method 500 of steering a vehicle with a control system in accordance with one set of embodiments. While the techniques and procedures of FIG. 5 are depicted and/or described in a certain order for purposes of illustration, it should be appreciated that certain procedures may be reordered and/or omitted within the scope of various embodiments. Moreover, while the method illustrated by FIG. 5 can be implemented by (and, in some cases, are described below with respect to) the systems (including without limitation control systems) and machines illustrated by FIGS. 1-4 (or components thereof), these methods may also be implemented using any suitable hardware implementation. Similarly, while the systems of FIGS. 1-4 (and/or components thereof) can operate according to the methods illustrated by FIG. 1 (e.g., by executing instructions embodied on a computer readable medium), the systems can also operate according to other modes of operation and/or perform other suitable procedures.

A control system in accordance with different embodiments might include a number of different instructions for operating the vehicle. Merely by way of example, the set of instructions might comprise instructions to implement operations in accordance with the method 500 of FIG. 5. FIG. 5 sets forth a method 500 that might comprise receiving, with a control system at least one steering input, as shown in block 505. As noted above, such steering inputs can be provided by any number of sources, including without limitation the operator, global navigation satellite system receiver, and/or automated steering system of the tracked vehicle. Steering inputs can comprise geographic coordinates, distances and/or directions from a known location, and manual inputs from the operator. Steering inputs can be pre-loaded into the control system or provided real-time by the vehicle's operator, global navigation satellite system receiver, and/or automated steering system.

The method 500 can further include identifying with the control system at least one operating condition of the vehicle as shown in block 510. The operating conditions of the vehicle can include the vehicle's speed, weight, width, current traction conditions, desired radius of an upcoming turn, and depth of trench to be created by the dragged implement. Operating conditions can also include conditions of the operating surface of the vehicle including soil type, texture, structure, porosity, density, moisture content, frost depth, and slope. In certain embodiments, these operating conditions can be determined by sensors on the tracked vehicle and/or operator input.

The method 500 can further include utilizing the control system to determine a combination of differential steering and rudder steering to perform the steering operation based on the one or more operating conditions as shown in block 515. In such a case, the control system controls the differential steering by controlling one or more tracks of the vehicle and controls the rudder steering by controlling the dragged implement as shown in blocks 520 and 525, respectively. As disclosed in the embodiment of FIG. 4, the control system receives instructions to determine a combination of differential steering with the tracks 450a and 450b and rudder steering with the dragged implement 410.

In certain embodiments, the desired combination of the differential and rudder steering may be determined based on whether the desired steering operation can be accomplished by creating a slight angle 430 (e.g., less than 5 degrees) between the dragged implement 410 and center line 490 as shown in FIG. 4. In such a case, the control system may determine that the steering operation can be performed solely through rudder steering while maintaining a constant track speed between the two tracks. Specifically, the instructions for the steering control system can include instructions to maintain a consistent track speed for tracks 450*a* and 450*b* and maintain the angle 430 of the dragged implement in order to perform the desired steering operation. By maintaining a consistent track speed, the tracked vehicle 405 can retain installation efficiency of the tile drainage while following the tile drainage path in a limited traction environment using the dragged implement to perform the steering operation.

Alternatively, if the angle 430 would need to be greater than 5 degrees to perform the desired steering operation, the control system may perform the steering operation solely through the differential steering. For example, the instructions of the steering control system can include instructions to allow the dragged implement 410 to rotate freely (i.e., to place in a float state) around the coupling mechanism connecting the dragged implement 410 to the tracked vehicle 405 while steering the tracked vehicle 405 by modifying the speed of either track 450*a* or 450*b* to perform the desired steering operation. Finally, for even more significant turning operations (e.g., where angle 430 must be greater than 15 degrees), the control system can use a combination of differential and rudder steering to steer tracked vehicle 405. As one of ordinary skill in the art would understand, the thresholds for angle 430 can be determined based on numerous factors comprising weight of the tracked vehicle 405, weight and surface area of dragged implement 410, desired depth of tile drainage, surface conditions, and current traction of tracks 450*a* and 450*b*.

Figure 6:
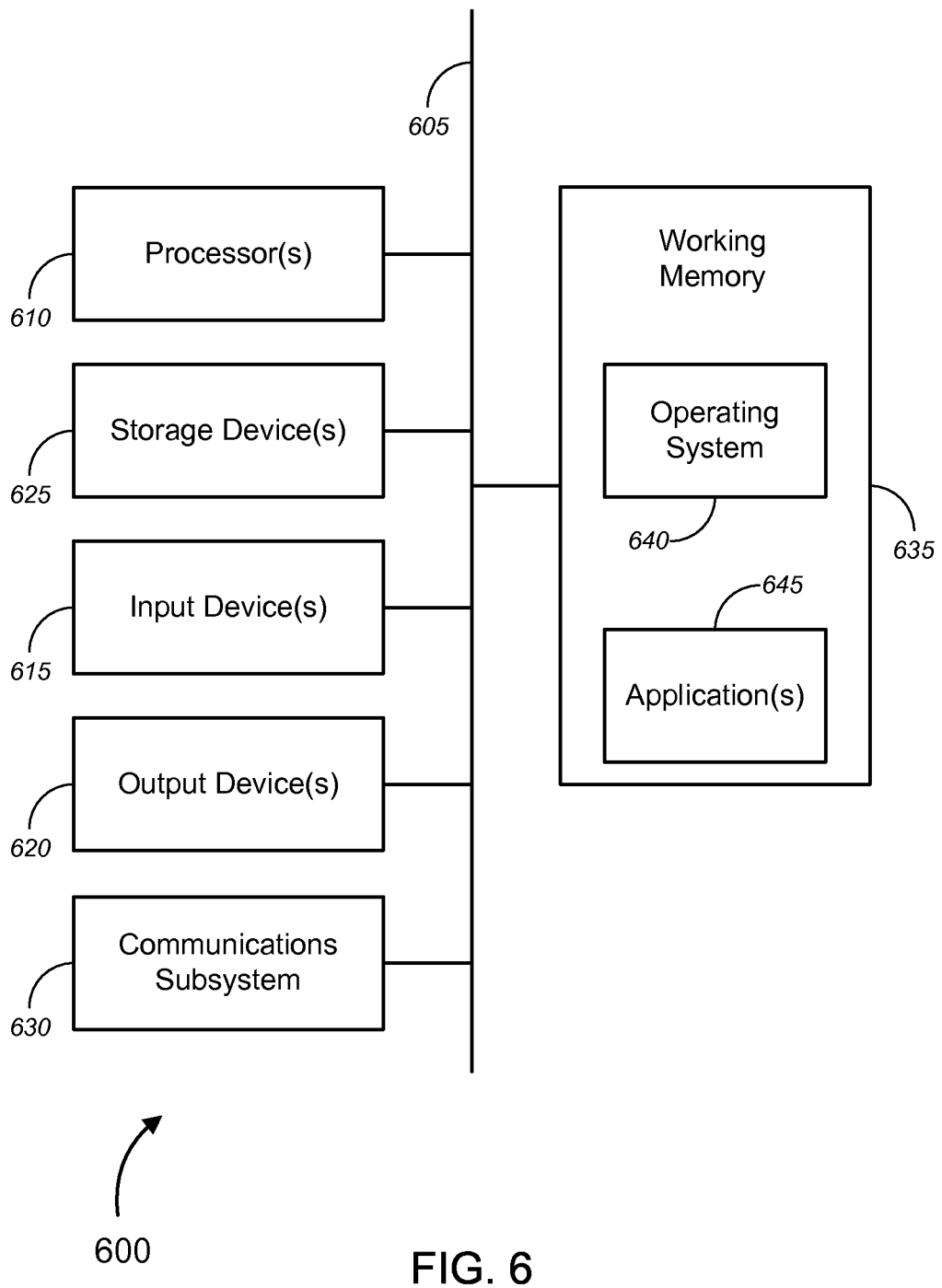
FIG. 6 is a generalized schematic diagram illustrating a computer system, in accordance with various embodiments.

FIG. 6 provides a schematic illustration of one embodiment of a computer system 600 that can perform the methods provided by various other embodiments, as described herein, and/or can function as the control system for tracked vehicles to perform steering operations using a combination of differential and rudder steering. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, touch screen, tablet, and/or the like; and one or more output devices 620, which can include without limitation a display device, a printer, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infra-red communication device, a wireless communication device, and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. Such a medium may take many forms, including but not limited to, non-volatile media, volatile media, and transmission media. Non-volatile media includes, for example, optical and/or magnetic disks, such as the storage device(s) 625. Volatile media includes, without limitation, dynamic memory, such as the working memory 635. Transmission media includes, without limitation, coaxial cables, copper wire, and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic, and/or light waves, such as those generated during radio-wave, and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 605 retrieves and executes the instructions. The instructions received by the working memory 635 may optionally be stored on a storage device 625 either before or after execution by the processor(s) 610.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A vehicle, comprising:
    a chassis;
    two tracks coupled with the chassis and configured to provide differential steering for the vehicle;
    a dragged implement coupled with the chassis by a coupling mechanism; and
    a control system comprising a processor and a non-transitory computer readable medium having encoded thereon a set of instructions executable by the processor to operate the control system, the set of instructions comprising:
        instructions to receive a steering input;
        instructions to identify one or more operating conditions of the vehicle;
        instructions to determine, based on the one or more operating conditions of the vehicle, a combination of differential steering and rudder steering to perform a steering operation;
        instructions to control the two tracks to apply the determined combination of differential steering and rudder steering to perform the steering operation; and
        instructions to control the dragged implement to apply the determined combination of differential steering and rudder steering to perform the steering operation.

2. The vehicle of claim 1, wherein the dragged implement is a tile plow to install drainage tile in an agricultural area.

3. The vehicle of claim 1, wherein the dragged implement is integrated with the vehicle and is permanently coupled with the vehicle by the coupling mechanism.

4. The vehicle of claim 1, wherein the dragged implement is a towed implement that is removably coupled with the chassis by the coupling mechanism.

5. The vehicle of claim 1, wherein the determined combination of differential steering and rudder steering consists entirely of rudder steering, wherein the instructions to control the two tracks comprise instructions to maintain a consistent track speed between the two tracks, and wherein the instructions to control the dragged implement comprise instructions to maintain the dragged implement at a specified angle to the chassis to perform the steering operation.

6. The vehicle of claim 1, wherein the determined combination of differential steering and rudder steering consists entirely of differential steering, wherein the instructions to control the dragged implement comprise instructions to allow the dragged implement to rotate freely about the coupling mechanism and relative the chassis, and wherein the instructions to control the two tracks comprise instructions to modify a speed of at least one of the tracks to perform the steering operation.

7. The vehicle of claim 1, wherein the coupling mechanism comprises one or more hydraulic pistons, and wherein controlling the dragged implement comprises controlling at least one of the hydraulic pistons to control a position of the dragged implement relative the chassis.

8. The vehicle of claim 1, wherein the steering input comprises manipulation of a steering control by an operator.

9. The vehicle of claim 1, wherein the steering input comprises input received from a navigation system.

10. The vehicle of claim 6, wherein the control system comprises the navigation system.

11. The vehicle of claim 6, wherein the control system operates the vehicle to conform to a drainage tile layout plan based on input received from the navigation system.

12. The vehicle of claim 1, wherein the instructions to identify one or more operating conditions comprise instructions to identify the one or more operating conditions based at least in part on input received from sensors on the vehicle.

13. The vehicle of claim 1, wherein the instructions to identify one or more operating conditions comprise instructions to identify the one or more operating conditions based at least in part on operator input.

14. The vehicle of claim 1, wherein the one or more operating conditions comprise a radius of a turn that the vehicle will undertake.

15. The vehicle of claim 1, wherein the one or more operating conditions comprise an amount of traction available to at least one of the tracks.

16. The vehicle of claim 1, wherein the one or more operating conditions comprise an angle between the dragged implement and the chassis.

17. The vehicle of claim 13, wherein the instructions to determine a combination of differential steering and rudder steering comprise instructions to compare the angle with one or more thresholds.

18. The vehicle of claim 14, wherein the control system comprises a user interface, and wherein the set of instructions further comprises:

instructions to receive, via the user interface, input from an operator to define at least one of the one or more thresholds.

19. The vehicle of claim 1, further comprising a controller area network ("CAN") bus, wherein the instructions to control the dragged implement comprise instructions to communicate with the coupling mechanism via the CAN bus.

20. A method of steering a vehicle, the method comprising:
receiving, with a control system of the vehicle, a steering input;
identifying, with the control system, one or more operating conditions of the vehicle;
determining, with the control system and based on the one or more operating conditions of the vehicle, a combination of differential steering and rudder steering to perform a steering operation;
controlling, with the control system, one or more tracks to apply the determined combination of differential steering and rudder steering to perform the steering operation; and
controlling, with the control system, a dragged implement to apply the determined combination of differential steering and rudder steering to perform the steering operation.

21. A control system for a vehicle, the control system comprising:
one or more processors; and
a computer readable medium in communication with the one or more processors, the computer readable medium having encoded thereon a set of instructions executable by the computer system to perform one or more operations, the set of instructions comprising:
instructions to receive a steering input;
instructions to identify one or more operating conditions of the vehicle;
instructions to determine, based on the one or more operating conditions of the vehicle, a combination of differential steering and rudder steering to perform a steering operation;
instructions to control one or more tracks of the vehicle to apply the determined combination of differential steering and rudder steering to perform the steering operation; and
instructions to control a dragged implement to apply the determined combination of differential steering and rudder steering to perform the steering operation.

* * * * *